US012699693B2

(12) United States Patent
Malvar Maua et al.

(10) Patent No.: US 12,699,693 B2
(45) Date of Patent: Aug. 4, 2026

(54) FRAMEWORK FOR LANGUAGE MODEL COPILOT DEVELOPMENT

(71) Applicant: Microsoft Technology Licensing, LLC, Redmond, WA (US)

(72) Inventors: Sara Malvar Maua, Brasilia (BR); Renato Luiz De Freitas Cunha, São Paulo (BR); Leonardo de Oliveira Nunes, Rio de Janeiro (BR); Ranveer Chandra, Kirkland, WA (US); Rafael Soares Padilha, Campinas (BR); Roberto De Moura Estevão Filho, Teresópolis (BR); Bruno Silva, Recife (BR); Morris Eli Sharp, Seattle, WA (US); Maria Angels De Luis Balaguer, Redmond, WA (US); Swati Sharma, Hayward, CA (US); Vinamra Benara, Berkeley, CA (US); Riyaz Mohamed Pishori, Sammamish, WA (US); Jessica Kristan Wolk, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 18/657,464

(22) Filed: May 7, 2024

(65) Prior Publication Data

US 2025/0348483 A1      Nov. 13, 2025

(51) Int. Cl.
G06F 16/2452          (2019.01)
(52) U.S. Cl.
CPC .............................. G06F 16/24522 (2019.01)
(58) Field of Classification Search
CPC ................................................. G06F 16/24522
See application file for complete search history.

(56) References Cited

U.S. PATENT DOCUMENTS

| | | | | | |
|---|---|---|---|---|---|
| 12,141,134 | B1 * | 11/2024 | Powar | ................ | G06F 16/2433 |
| 12,456,020 | B1 * | 10/2025 | Mishra | .................... | G06F 40/40 |
| 2025/0036887 | A1 * | 1/2025 | Sukhija | ................ | G06F 40/205 |
| 2025/0053582 | A1 * | 2/2025 | Yao | .......................... | G06F 40/35 |
| 2025/0078823 | A1 * | 3/2025 | Fan | .......................... | G06F 40/35 |
| 2025/0104693 | A1 * | 3/2025 | Papayiannis | ............ | G10L 13/10 |
| 2025/0156413 | A1 * | 5/2025 | Barkan | ................ | G06F 40/295 |

(Continued)

FOREIGN PATENT DOCUMENTS

WO       WO-2024207009 A1 * 10/2024   ............. G06F 40/30

OTHER PUBLICATIONS

Sahil Girhepuje, Siva Sankar Sajeev, Purvam Jain, Arya Sikder, Adithya Rama Varma, Ryan George, Akshay Govind Srinivasan, Mahendra Kurup, Ashmit Sinha, Sudip Mondal, "Re-gains & EnCHANT: Intelligent Tool Manipulation Systems For Enhanced Query Responses", 2024, https://arxiv.org/abs/2401.15724v1 (Year: 2024).*

(Continued)

*Primary Examiner* — Eric Yen
(74) *Attorney, Agent, or Firm* — Ray Quinney & Nebeker P.C.; Tiffany B. Healy

(57)          ABSTRACT

The present disclosure relates to systems and methods for creating a copilot. The copilot uses plugins to provide additional features and functionalities to the copilot. The systems and methods use a large language model (LLM) pipeline to generate a knowledge resource used by the plugins and/or an LLM in the copilot to answer queries from a user.

20 Claims, 10 Drawing Sheets

(56) References Cited

U.S. PATENT DOCUMENTS

| | | | |
|---|---|---|---|
| 2025/0200293 A1* | 6/2025 | Liu | G06F 40/35 |
| 2025/0298970 A1* | 9/2025 | Khosla | G06F 40/20 |

OTHER PUBLICATIONS

Minghao Li, Yingxiu Zhao, Bowen Yu, Feifan Song, Hangyu Li, Haiyang Yu, Zhoujun Li, Fei Huang, Yongbin Li, "API-Bank: A Comprehensive Benchmark for Tool-Augmented LLMs", 2023, https://arxiv.org/abs/2304.08244 (Year: 2023).*

Yuchen Zhuang, Yue Yu, Kuan Wang, Haotian Sun, Chao Zhang, "ToolQA: A Dataset for LLM Question Answering with External Tools", 2023, https://arxiv.org/abs/2306.13304 (Year: 2023).*

Balaguer, et al., "Ragvs Fine-Tuning: Pipelines, Tradeoffs, and a Case Study on Agriculture", Computer Science, 2024, 33 pages.

* cited by examiner

Figure 4:
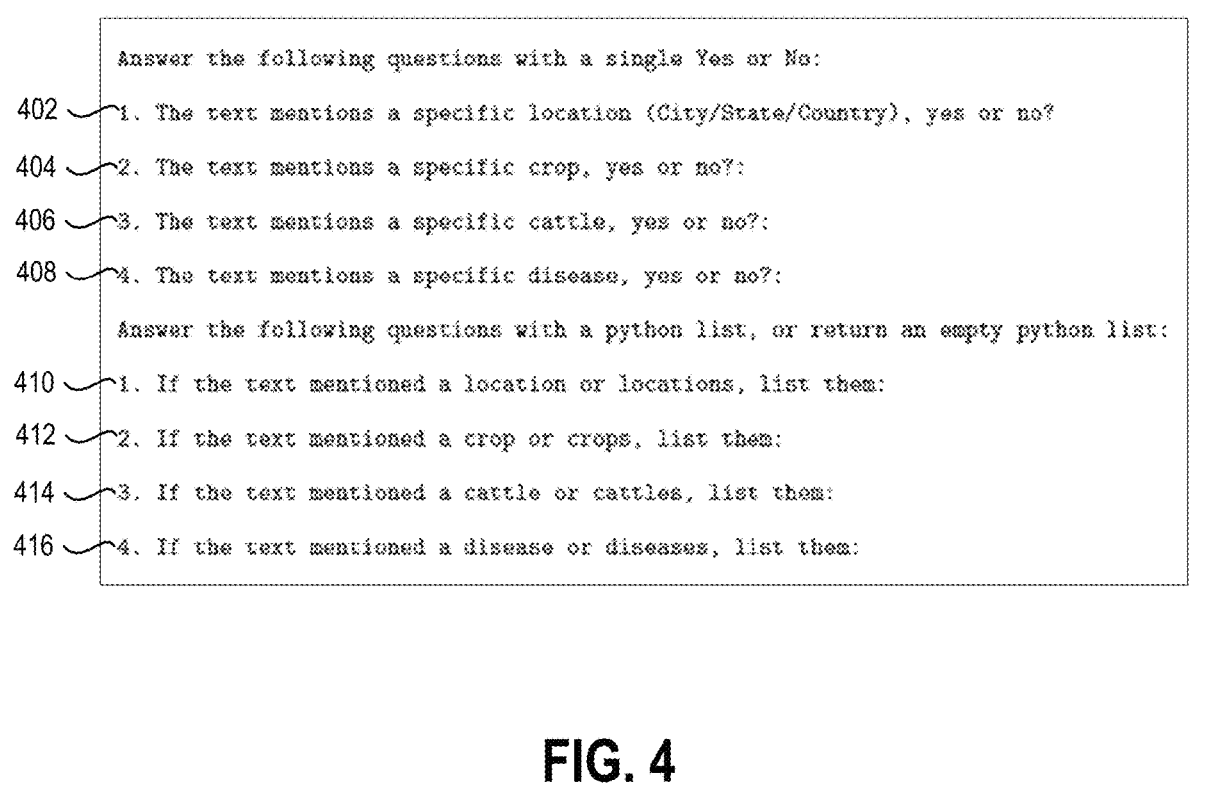

```
Answer the following questions with a single Yes or No:

1. The text mentions a specific location (City/State/Country), yes or no?

2. The text mentions a specific crop, yes or no?:

3. The text mentions a specific cattle, yes or no?:

4. The text mentions a specific disease, yes or no?:

Answer the following questions with a python list, or return an empty python list:

1. If the text mentioned a location or locations, list them:

2. If the text mentioned a crop or crops, list them:

3. If the text mentioned a cattle or cattles, list them:

4. If the text mentioned a disease or diseases, list them:
```

| Question | Relevance Score ⬆ | Explanation |
|---|---|---|
| How can adaptive management practices benefit soil health in the inland Pacific Northwest? | 5 | The context heavily focuses on the challenges faced by farmers in the inland Pacific Northwest region and various strategies that can be adopted to overcome those challenges. The farmer would likely be interested in understanding how they can manage and improve soil health in the region, given the challenges of soil erosion, soil organic matter depletion, and consequent soil fertility loss, and the book covers this topic in detail in Chapter 2. Therefore, this question would be highly relevant and informative for a farmer in the region. |
| How can understanding insect pests' distribution, life cycle, and crop damage help in their management in the inland Pacific Northwest? | 1 | The provided context does not mention anything about insect pests, so it is unlikely that a farmer would ask this question based on the given information. |

FIG. 5

| | |
|---|---|
| Succinctness ↑ | |
| 602 — Score | 5 |
| Question | What is the scientific name of the white pine weevil? |
| Answer | The scientific name of the white pine weevil is Pissodes strobi. |
| Reference Answer | Pissodes strobi |
| 604 — Explanation | The response is on point and does not contain any additional information. The user is able to understand the point quickly. |
| 606 — Score | 2 |
| Question | What is the purpose of salting fish before smoking? |
| Answer | The purpose of salting fish before smoking is to help remove moisture from the fish and to preserve it by inhibiting the growth of bacteria. Salt draws out the moisture from the surface of the fish, making it firm and creating a barrier that prevents bacteria from multiplying. It also enhances the flavor of the fish and helps to prevent it from spoiling. This process is commonly used in curing and preserving fish, and is an important step in the preparation of smoked fish. |
| Reference Answer | Salting fish before smoking preserves the fish by reducing its moisture content. |
| 608 — Explanation | The predicted answer provides a lot of additional information about the process of salting fish, including how it works and why it's important. While this information is relevant and informative, it goes beyond the scope of the original question, which simply asked for the purpose of salting fish before smoking. Therefore, the response is verbose. |

FIG. 6

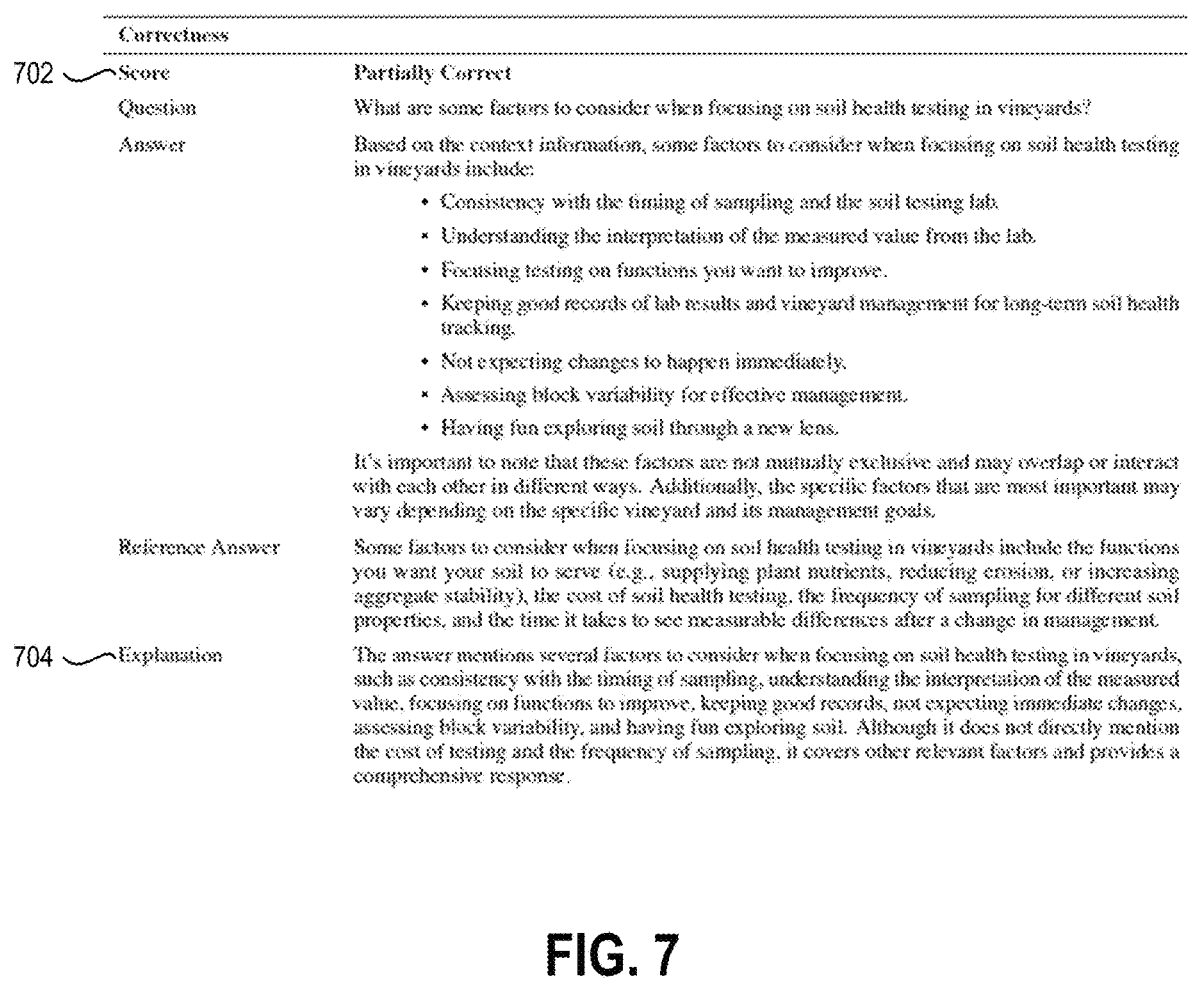

Correctness

702 — Score          Partially Correct

Question      What are some factors to consider when focusing on soil health testing in vineyards?

Answer      Based on the context information, some factors to consider when focusing on soil health testing in vineyards include:

- Consistency with the timing of sampling and the soil testing lab.
- Understanding the interpretation of the measured value from the lab.
- Focusing testing on functions you want to improve.
- Keeping good records of lab results and vineyard management for long-term soil health tracking.
- Not expecting changes to happen immediately.
- Assessing block variability for effective management.
- Having fun exploring soil through a new lens.

It's important to note that these factors are not mutually exclusive and may overlap or interact with each other in different ways. Additionally, the specific factors that are most important may vary depending on the specific vineyard and its management goals.

Reference Answer      Some factors to consider when focusing on soil health testing in vineyards include the functions you want your soil to serve (e.g., supplying plant nutrients, reducing erosion, or increasing aggregate stability), the cost of soil health testing, the frequency of sampling for different soil properties, and the time it takes to see measurable differences after a change in management.

704 — Explanation      The answer mentions several factors to consider when focusing on soil health testing in vineyards, such as consistency with the timing of sampling, understanding the interpretation of the measured value, focusing on functions to improve, keeping good records, not expecting immediate changes, assessing block variability, and having fun exploring soil. Although it does not directly mention the cost of testing and the frequency of sampling, it covers other relevant factors and provides a comprehensive response.

FIG. 7

800

You

10   What products were applied to my Lowery field in the year 2023?

Copilot

802   In 2023, the following products were applied to your Lowery field:
1. 32-0-0 UAN: 85.2 acres at an average rate of 1.0 gal/ac
2. Ally Extra: 85.2 acres at an average rate of 0.4 oz/ac
3. Liberate: 85.2 acres at an average rate of 2.4 oz/ac
4. MiCrop: 85.2 acres at an average rate of 10 oz/ac
5. Osprey Xtra: 18.8 acres at an average rate of 4.8 oz/ac
6. Power-Up: 85.2 acres at an average rate of1.0 gal/ac
7. Truslate: 85.2 acres at an average rate of 24.0 oz/ac Please note that this information is based on the data available for your field.

FIG. 8

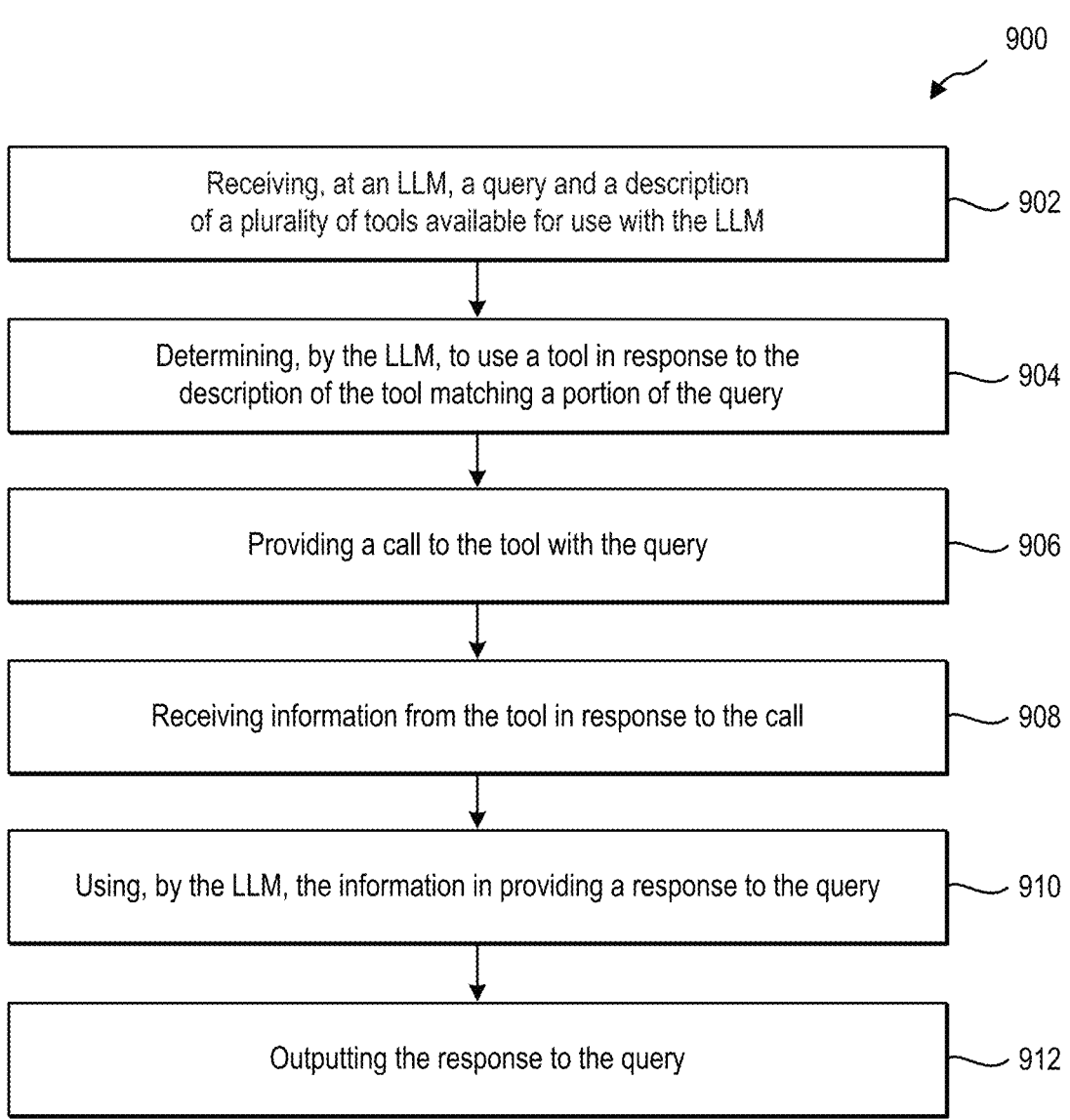

900

Receiving, at an LLM, a query and a description of a plurality of tools available for use with the LLM    902

Determining, by the LLM, to use a tool in response to the description of the tool matching a portion of the query    904

Providing a call to the tool with the query    906

Receiving information from the tool in response to the call    908

Using, by the LLM, the information in providing a response to the query    910

Outputting the response to the query    912

FIG. 9

FRAMEWORK FOR LANGUAGE MODEL COPILOT DEVELOPMENT

BACKGROUND

Over the past few years, artificial intelligence and natural language processing have seen significant advancements, leading to the development of powerful large language models (LLMs). The adoption of Artificial Intelligence (AI) copilots across various industries is revolutionizing the way businesses operate and interact with their environment. These AI copilots, powered by LLMs, provide invaluable assistance in data processing and decision-making processes.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some implementations relate to a method. The method includes receiving, at a large language model (LLM), a query and a description of a plurality of tools available for use with the LLM. The method includes determining, by the large language model, to use a tool of the plurality of tools in response to the description of the tool matching a portion of the query. The method includes providing a call to the tool with the query. The method includes receiving information from the tool in response to the call. The method includes using, by the LLM, the information in providing a response to the query. The method includes outputting the response to the query.

Some implementations relate to a device. The device includes a processor; memory in electronic communication with the processor; and instructions stored in the memory, the instructions being executable by the processor to: receive, at a large language model (LLM), a query and a description of a plurality of tools available for use with the LLM; determine, by the large language model, to use a tool of the plurality of tools in response to the description of the tool matching a portion of the query; provide a call to the tool with the query; receive information from the tool in response to the call; use, by the LLM, the information in providing a response to the query; and output the response to the query.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 4 illustrates example questions generated during the question and answer generation portion of the LLM pipeline in accordance with implementations of the present disclosure.

FIG. 5 illustrates an example evaluation of questions generated during the question and answer generation portion of the LLM pipeline in accordance with implementations of the present disclosure.

FIG. 6 illustrates an example evaluation of answers generated during the question and answer generation portion of the LLM pipeline in accordance with implementations of the present disclosure.

FIG. 7 illustrates an example evaluation of answers generated during the question and answer generation portion of the LLM pipeline in accordance with implementations of the present disclosure.

FIG. 8 illustrates an example output provided by the copilot in response to a query in accordance with implementations of the present disclosure.

FIG. 9 illustrates an example method for responding to queries using a copilot in accordance with implementations of the present disclosure.

DETAILED DESCRIPTION

Figure 1:
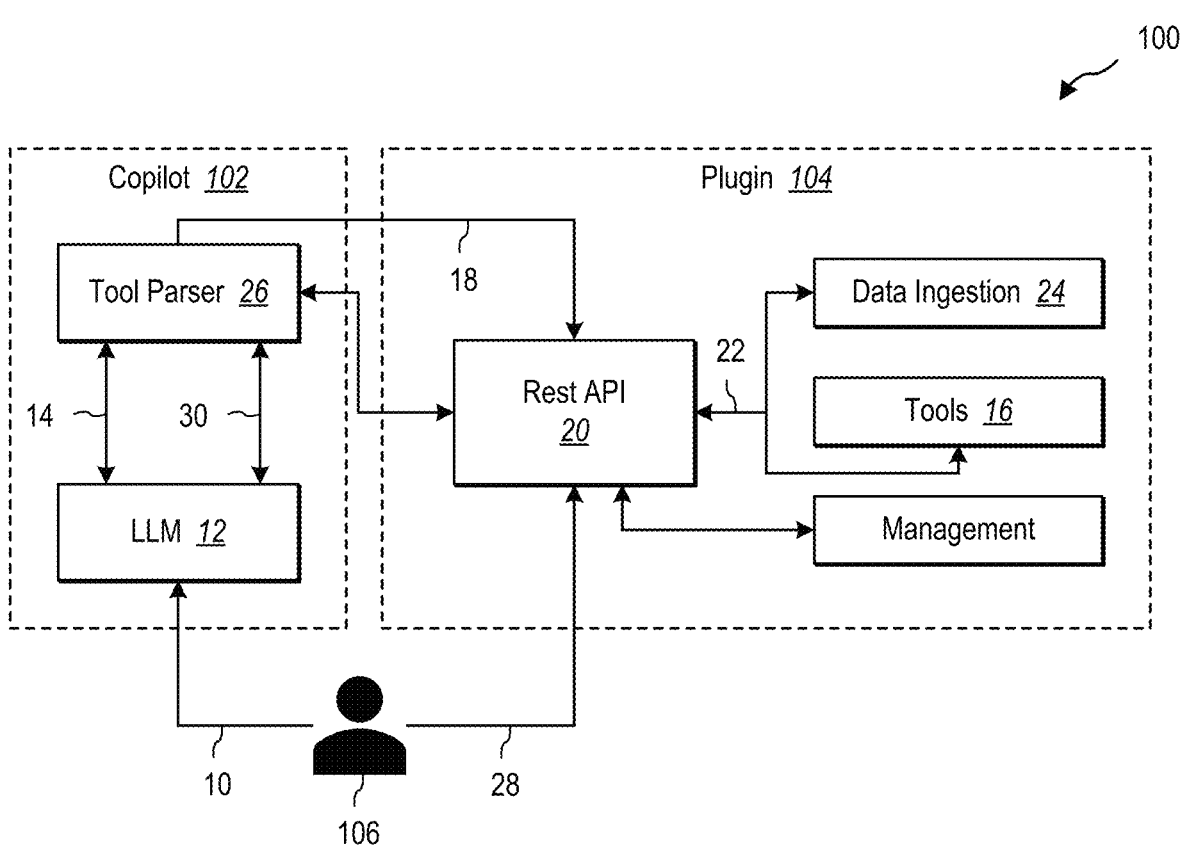
FIG. 1 illustrates an example environment for using plugins with a large language model copilot in accordance with implementations of the present disclosure.

This disclosure generally relates to the creation of Artificial Intelligence (AI) copilots. The adoption of AI copilots across various industries is revolutionizing the way businesses operate and interact with their environment. These AI copilots, typically powered by large language models (LLMs), provide invaluable assistance in data processing and decision-making processes. LLMs, such as the Generative Pre-trained Transformer (GPT)-4 and Llama2, are being used to support the copilots. In healthcare, for example, AI copilots are being leveraged to predict patient risks and improve diagnostic accuracy. In manufacturing, the AI copilots aid in enhancing operational efficiency, reducing downtime, and improving product quality. In the realm of finance, AI copilots help in fraud detection, risk management, and investment decision-making.

The application of AI in specific fields is still limited due to a lack of specialized training data for the specific fields. Moreover, some users of AI copilots have very specific questions about their industries and responding to the questions often require knowledge of local conditions, specific varieties, and up-to-date data that might not be readily available through general search engines. One example of a field where the application of AI is limited is the agriculture industry.

The present disclosure provides systems and methods for the creation of AI copilots. The systems and methods aid in the creation of custom copilots for industries or domains where responses from a copilot are expected to be grounded by relevant industry-specific factors. The present disclosure includes a number of practical applications that provide benefits and/or solve problems associated with creating copilots. Examples of these applications and benefits are discussed in further detail below.

The system and methods aid users in creating custom copilots. In some implementations, the copilots are created for industries that require specific context and adaptive responses. One example industry is the agriculture industry. The systems and methods allow users to select and/or create plugins to use with the copilot. The plugins provide additional features and functionalities to the copilot. By allowing the users to dynamically add or create plugins for use with the copilots, the users may customize the copilot to a specific use or a context of the user.

The systems and methods use a comprehensive LLM pipeline to generate high-quality, industry-specific questions and answers for use with the copilot. The LLM pipeline incorporates automatic data ingestion from multiple sources, intelligent data extraction, and a question and answer generation mechanism. The LLM pipeline includes question and answer generation, retrieval-augmented generation (RAG), and a fine-tuning process. The LLM pipeline involves the identification and collection of relevant documents encompassing a wide range of topics for the industry. The LLM pipeline extracts data from the documents to facilitate the generation of meaningful question and answer pairs using a LLM, such as, a GPT model. The generated pairs of questions and answers are subsequently evaluated and filtered based on quality. In some implementations, the LLM pipeline is used to train specialized models used with the plugins to answer specific queries. The generated data using the LLM pipeline is then refined and used to fine-tune several models while their quality is evaluated using a combination of proposed metrics. In some implementations, the LLM pipeline is used to fine-tune GPT-4 models. In some implementations, the LLM pipeline is used to generate a knowledge resource used by the plugins and/or the LLM in the copilot to answer queries from the user.

One technical advantage of the systems and methods of the present disclosure is providing faster responses to queries. The systems and methods use parallel run capabilities to process multiple documents concurrently, improving the speed and efficiency of the LLM pipeline. The systems and methods use plugins to aid the LLM in providing responses faster to a user. Another technical advantage of the systems and methods of the present disclosure is providing an industry-specific dataset for use by the copilot or LLMs. Another technical advantage of the systems and methods of the present disclosure is customizing a copilot. The systems and methods allow users to customize a copilot to a specific context to provide responses grounded by relevant context-specific factors.

Referring now to FIG. 1, illustrated is an example environment 100 for using plugins with a copilot 102. Users 106 access the copilot 102 using a device and the provide queries 10 to the copilot 102. The copilot 102 is an artificial intelligence (AI) tool that provides real-time intelligent assistance to users 106 in responding to the queries 10 provided by the user 106. The copilot 102 uses one or more LLMs 12 to understand the queries 10, summarize, predict, and generate content in response to the queries 10. An example of the LLM 12 is a Generative Pre-Trained Transformers (GPT), such as, GPT-4. Another example of the LLM 12 is Llama2.

The copilot 102 uses one or more plugins 104 to enhance the capabilities of the LLM 12 and provide responses to the queries 10. Each plugin 104 performs a function or set of functions. Example functions include calling external application programming interfaces (APIs), running code, performing a computation, finding information in documents, generating graphs, analyzing images, and generating maps. The plugins 104 may use any type of data (e.g., images, documents, text, portable document format (PDF) s, audio, etc.) when performing the functions, extending the capabilities of the LLM 12 beyond text in responding to the queries 10 of the user 106. The plugins 104 are standalone services that provide addition features or functionalities to the LLM 12 in responding to the queries 10 of the user 106. Each plugin 104 has one or more tools 16 that perform the functions of the plugin 104. Each tool 16 performs a function. In some implementations, the plugins 104 are remote from the copilot 102. For example, the plugins 104 are different services provided by a cloud service for use with the copilot 102.

Upon creation of the plugin 104, a data ingestion process 24 occurs in response to configuration parameters 28 provided by the user 106 for the plugin 104. For example, the user 106 creates a plugin 104 to review satellite imagery of a field and provides configuration parameters 28 for the plugin 104 with the location of the field (e.g., latitude and longitude geographic coordinates of the field) and a data source for the satellite imagery. The data ingestion process 24 includes obtaining the satellite imagery of the location specified for the filed. Another example includes a user 106 creating a plugin 104 to obtain weather forecasts for a location and provides configuration parameters 28 with a location for the weather forecast and a preferred source for the weather forecast. The data ingestion process 24 includes accessing the source for the weather forecast and obtaining the weather forecast for the specified location. The data ingestion process 24 prepares the data so the data is ready for use with the plugins 104. For example, the data ingestion process 24 occurs periodically (e.g., every day) to update the data for use with the plugins 104. Another example includes the data ingestion process 24 occurs in response to the plugin 104 being used by the copilot 102.

The plugins 104 are dynamically added for use with the copilot 102. In some implementations, a set of the plugins 104 are automatically selected for use with the copilot 102 for a specific industry or domain of the user 106. For example, if the user 106 is in agriculture a set of plugins 104 that perform functions related to agriculture are automatically selected for use with the copilot 102 (e.g., plugins that provide a weather forecast for a region where a farm is located, plugins that obtain imagery data from drones on the farm, plugins that analyze sensor data from the farm, plugins that analyze satellite imagery obtained of a farm, plugins that obtain information from agriculture documents, etc.).

In some implementations, the plugins 104 are selected by the user 106 for use with the copilot 102. For example, a list of previously created plugins 104 is provided to the user 106 with a description of the functions that the plugins 104 perform and the user 106 selects one or more plugins 104 for use with the copilot 102. In some implementations, the plugins 104 are designed by the user 106 for use with the copilot 102. For example, the user 106 creates one or more plugins 104 to use with the copilot 102. The user 106 uses an interface on the device to design a plugin 104 and customize the functions performed by the plugin 104.

By allowing the dynamic selection or creation of the plugins 104, the user 106 may create a custom copilot 102 to help the LLM 12 provide responses to the queries 10 of the user 106 in a specific context of the user 106. Moreover, by allowing the dynamic addition of plugins 104 to the copilot 102, any type of data (e.g., images, graphs, PDFs, audio, documents, etc.) can be made available for use by the LLM 12 in responding to the queries 10.

The plugins 104 are in a standard format that allows the plugins 104 to easily integrate with the copilot 102 for use with the LLM 12 in responding to the queries 10. An example of the standard format is the OpenAPI specification format. By using a standard format, a tool parser 26 of the copilot 102 can review the available plugins 104 and provide a description 14 of the tools 16 available for use with the plugins 104 to the LLM 12. The standard format maps the specification of the plugins 104 to a specification used by the LLM 12 so the LLM 12 may call the plugin 104 and receive a response from the plugin 104 and use the responses from the plugins 104 in responding to the queries 10 provided by the user 106.

In some implementations, the tool parser 26 sends a request 18 to a rest API 20 of the plugin 104 and receives from the rest API 20 a set of tools 16 available for the one or more plugins 104 available for use with the copilot 102 and a description of the functions performed by the set of tools 16. The tool parser 26 provides the description 14 of the functions available for the set of tools 16 to the LLM 12.

The LLM 12 receives a query 10 from the user 106 and uses the description 14 of the tools available 16 in determining whether to use a tool 16 in responding to the query 10. If the LLM 12 can provide a response to the query 10 without the aid of the tool 16, the LLM 12 generates a response to the query 10 and the copilot 102 provides the response to the user 106.

If the LLM 12 determines to use one or more tools 16 in responding to the query 10, the LLM provides a call 30 to the tool parser 26 identifying a selected tool 16 or set of tools 16 to use in responding to the query 10. For example, if the description of the tool 16 matches a portion of the query 10, the LLM 12 may decide to use a function of the tool 16 to aid the LLM 12 in responding to the query 10. In some implementations, the LLM 12 sends the query 10 to the tool parser 26 to provide to the selected tool 16 as input to the tool 16. The tool 16 uses the query 10 as input, performs a function on the query 10, and provides a response 22 with the result of the function performed by the tool 16 to the rest API 20. The rest API 20 forwards the response 22 to the copilot 102 for the LLM 12 to use in responding to the query 10. In some implementations, the LLM 12 generates a sub query from the query 10 and sends a sub query as input to the tool 16. The tool 16 performs a function on the sub query and provides a response 22 with the result of the function performed by the tool 16 to the rest API 20. The rest API 20 forwards the response 22 to the copilot 102 for the LLM 12 to use in responding to the query 10. In some implementations, the LLM 12 sends a plurality of calls 30 to the tool parser 26 with the query 10 to send to a set of tools 16. The set of tools 16 use the query 10 as input and provide responses 22 with the results of the functions performed by the set of tools 16. For example, the plurality of calls 30 are sent to the set of tools 16 in parallel. Another example includes the plurality of calls 30 sent to the set of tools 16 in a chain.

The environment 100 enhances the capabilities of the LLM 12 by making the plugins 104 available for use by the LLM 12 to provide tailored responses to a context of the user 106 in responding to queries 10 provided by the user 106. The environment 100 provides the ability for users 106 to create custom copilots 102 by adding plugins 104 for use with the copilots 102 and/or creating customized plugins 104 for use with the copilots 102.

In some implementations, one or more computing devices (e.g., servers and/or devices) are used to perform the processing of the environments 100. The one or more computing devices may include, but are not limited to, server devices, cloud virtual machines, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the copilot 102 is implemented on a single computing device. Moreover, in some implementations, one or more subcomponent of the feature and functionalities discussed herein may be implemented are processed on different server devices of the same or different cloud computing networks. For example, the copilot 102 and the plugins 104 are implemented on different server devices.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
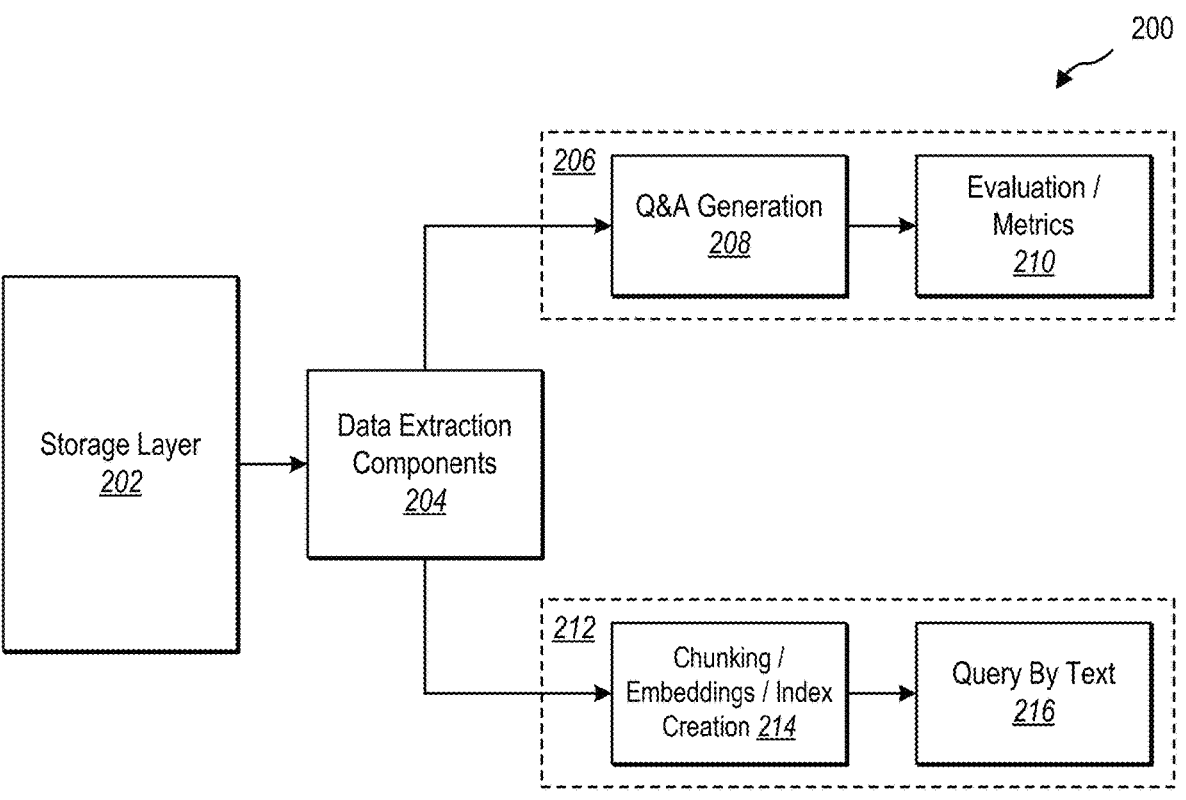
FIG. 2 illustrates an example method of a large language model pipeline in accordance with implementations of the present disclosure.

FIG. 2 illustrates an example method of an LLM pipeline 200. The LLM pipeline 200 is used to generate high-quality, industry-specific custom datasets for use with LLMs. In some implementations, the custom datasets generated by the LLM pipeline 200 are used for training a LLM for use with the plugins 104 (FIG. 1). For example, the plugins 104 use specially trained LLMs for responding to specific queries (e.g., the query 10 (FIG. 1)). Using specialized trained LLMs in the plugins 104 expands the capabilities of the copilot 102 (FIG. 1) in responding to queries 10 provided by the users 106 (FIG. 1). In some implementations, the custom datasets generated by the LLM pipeline 200 are used by the LLM 12 (FIG. 1) in responding to queries 10 provided by the users 106.

At 202, the LLM pipeline 200 includes obtaining a custom dataset. The LLM pipeline includes a storage layer for the custom dataset. The custom dataset is a curated dataset for an industry or domain of the user. The dataset may include documents with various forms of data (e.g., PDFs, images, text, tables, graphs, etc.). Obtaining the custom dataset includes the identification and collection of relevant documents encompassing a wide range of topics for the industry. In some implementations, the custom dataset is provided by a user.

In some implementations, the custom dataset is automatically obtained by sourcing data from various high-quality repositories such as government agencies, scientific knowledge databases, and proprietary data, if needed, and gathering a diverse and curated dataset pertinent to the industry domain. The data sources selected for sourcing the data contain high-quality, authoritative information on the topic of interest. For example, in agriculture, this includes agricultural and environmental government agencies, scientific knowledge repositories, and agronomist exams databases. In some implementations, web scraping tools (e.g., SCRAPY and BEAUTIFULSOUP) are used to automatically gather the required data for the custom dataset of the identified sources. In some implementations, the user 106 is in a specific location or geographic region and the data obtained is related to the specific location or geographic region. For example, in the case of agricultural data, guidelines and procedures that are geography-specific, i.e., with a shared location among documents, are obtained for the custom dataset.

At 204, the LLM pipeline 200 includes extracting data by extracting text from the custom dataset. In some implementations, data extraction components use a combination of different machine learning based approaches to transform the information in the documents in the custom dataset into a standard format usable by LLMs. For example, the if the documents included in the custom dataset include visual based documents (e.g., PDFs, images, tables, graphs, etc.) the data extraction components extract the information from the documents and coverts the information into text usable by the LLMs.

At 206, the LLM pipeline 200 includes training a LLM model using the custom dataset. In some implementations, the training is used to finetune a LLM model to answer specific questions. In some implementations, the training is used to specialize a LLM model for a specific industry or domain. The training 206 includes generating training data and evaluating the training data.

At 208, the LLM pipeline 200 includes generating questions and answers from the text extracted from the documents and using the questions and answers pairs as training data to train the LLM model. In some implementations, a question and answer generation component use the text extracted from the documents to generate question and answers pairs to create a training dataset to train the LLM model to answer questions based on the dataset. The training dataset generates contextually grounded and high-quality questions that accurately reflect the content of the extracted text. Controlling the structural composition of both inputs and outputs during the training of the LLM model results in outputs that are more precise and exhibit enhanced coherence and contextual relevance.

In some implementations, context-specific prompts are created for the questions that contribute to a heightened level of semantic relevance in the resultant text providing by the LLM model in providing answers to the questions. The content and structure of available documents is augmented by explicitly adding supporting tags from the text. Prompts are created for the questions that extract a list of locations and agronomic topics mentioned in each section of the document (e.g., if that section refers to crops, cattle, or diseases), and task the LLM to answering them based on the data extracted. The additional information used by the LLM to answer the questions, including locations and mentioned topics, grounds the generation process, enhancing the relevance of the questions and guiding the model to cover a wide range of topics and challenges.

In some implementations, the question and answer generation component combines the supporting context and section content, prompting the LLM to generate a set of questions based on the context and section content. The prompt includes a system preamble that guides the LLM into formulating assessment questions related to industrial topics based on the document content. In some implementations, a user portion provides few-shot examples of the types of expected questions, as well as the content and supporting context used for generation. For example, the LLM generates a set of 5 to 15 questions per section of the document. In some implementations, Retrieval-Augmented Generation (RAG) is used by the LLM to create answers in response to the set of questions the LLM generated.

At 210, the LLM pipeline 200 includes evaluating the question and answer pairs and the responses provided by the LLM using the question and answer pairs. The generated pairs of questions and answers are subsequently evaluated and filtered based on quality using a combination of proposed metrics.

In some implementations, the proposed metrics include relevance of the informativeness of a generated question and answer pair from a perspective of the user 106 ensuring that the generated content is relevant and accurate to the target audience, considering all provided information. For example, LLMs (e.g., GPT-4) are used to rate the question on a scale of 1 to 5, with 5 being a question that would be asked by the user and 1 a question that would not, given the context.

In some implementations, the proposed metrics include global relevance to measure the information generated by a question and answer pair from a perspective of a user 106 without considering any context ensuring the generated content is relevant and accurate to a target audience. For example, a LLM (e.g., GPT-4) rates the question and answer pair generated during the training process on a scale of 1 to 5 whether the question would be asked by the user and 1 a question that would not.

In some implementations, the proposed metrics include coverage to gauge whether the generated answers can be directly extracted from the provided context and how well the model avoids hallucinating. For example, LLMs are used to rate the answerability of each question and answer pair on a scale of 1 to 5. A higher score indicates that the answer can be more reliably extracted from the context, ensuring the model's output is grounded in the available information.

In some implementations, the proposed metrices include overlap to assess the semantic similarity between the generated question and the source text/section. For example, Kullback-Leibler (KL) divergence is used as a measure. KL divergence is an asymmetric measure that quantifies the difference between two probability distributions, in this case, the word probability distributions of the source text and the concatenated questions. By leveraging the smoothed counts of words in the texts, allows for a more nuanced comparison of their semantic content. A lower KL divergence value indicates a higher degree of semantic overlap between the questions and the text, which is desired for effective question and answer generation.

In some implementations, the proposed metrics include diversity to evaluate the variety of questions generated by the system. For example, Word Mover's Distance (WMD) is used as a measure for measuring the semantic similarity between two documents or text samples. WMD leverages word embeddings, such as Word2Vec or GloVe, which represent words as high-dimensional vectors capturing their semantic meaning. The embeddings enable the computation of distances between words in a continuous semantic space, allowing for a more nuanced comparison of the meanings of two text samples. A smaller WMD value indicates a higher degree of overlap in meaning between the question and the text, which is desired for effective question and answer generation. A similarity matrix is computed between all generated questions. By calculating the average of the off-diagonal elements in this matrix, a measure of diversity is obtained. A smaller average value indicates greater similarity among questions and, therefore, less diversity.

In some implementations, the proposed metrics include assessing the level of details in both the generated questions and answers by counting the number of tokens (words) in each, providing insight into the depth and specificity of the content generated by the question and answer system.

In some implementations, the proposed metrics include assessing the fluency and coherence of the question and answer pairs. For example, LLMs, such as GPT-4, assess fluency and coherence by preparing a prompt that instructs the LLMs to rate a given question on a scale of 1 to 5 and provide an explanation, the model can generate insightful scores for each question. After appending the generated question to the prompt, submitting it to GPT-4, and parsing the response to extract the fluency score and explanation, the results can be stored for further analysis. Using GPT-4's language understanding capabilities to assess the quality of generated questions, aids in refining question-generation models and selecting the best questions for specific applications.

In some implementations, the proposed metrics include evaluation a coherence of the answers provided to the questions by comparing coherence between ground truths and predictions given the context. The metric provides a score between one to five, where one means that the answer lacks coherence and five means the answer has perfect coherency.

In some implementations, the proposed metrics include evaluation a relevance of the answers provided to the questions by measuring how well the answer addresses the main aspects of the question based on the context. The metric rates from 1 to 5, where 5 means the answer has perfect relevance.

In some implementations, the proposed metrics include evaluating how grounded an answer is to the question. The metric defines weather the answer follows logically from the information contained in the context or not and provides and integer score to whether the answer is grounded.

In some implementations, the proposed metrics include evaluating a succinctness of the answers using a scoring sheet describing what succinct and verbose answers might contain. For example, the scoring sheet is provided as a prompt to a LLM (e.g., GPT-4), the ground truth answer, and the LLM answer, and asked for a grade on a scale from 1 to 5.

In some implementations, the proposed metrics include evaluating a correctness of the answers using a scoring sheet describing what a complete, partially correct, or incorrect answer contains. For example, the scoring sheet is provided as a prompt to a LLM (e.g., GPT-4), the ground truth answer, and the LLM answer, and asked for a grade of correct, incorrect, partially correct.

By employing a combination of the proposed metrics, the evaluation process can effectively evaluate and refine the question and answer generation process, ensuring that the generated content is informative, relevant, diverse, and grounded in the source material leading to a more useful and effective question and answer generation system for the target audience.

At 212, the LLM pipeline 200 includes using the custom dataset to answer questions. The custom dataset is provided as a knowledge resource used by the plugins 104 and/or the LLMs (e.g., the trained LLMs from 206 and/or the LLM 12 in the copilot 102) in the copilot 102 to answer queries 10 from the user 106. In some implementations, Retrieval-Augmented Generation (RAG) is used to query the index to identify the information to provide for use with the LLMs to answer the queries.

At 214, the LLM pipeline 200 includes creating an index for the extracted data from the documents at 204. The index includes embeddings for portions of the extracted data that supports similarity search of vectors. In some implementations, the portions of smaller chunks of the extracted data. For example, a PDF document with 300 pages is divided into 50 page chunks and stored in the index with embeddings for each 50 page chunk of the PDF document. In some implementations, the embeddings are computed from text chunks extracted from the PDF documents in the custom dataset, using sentence transformers.

At 216, the LLM pipeline 200 includes querying the index to retrieve information from the index and provide it the information to an LLM (e.g., the trained LLMs from 206 and/or the LLM 12 in the copilot 102) to answer queries (e.g., the queries 10 provided by the user 106). Given an input question (e.g., the queries 10 or a portion of the queries 10), an embedding is computed for the input question and used to perform a similarity search with score to return relevant chunks from data from the index (e.g., a top number of similar portions of data in the index are returned that are related to the question). The retrieved information (e.g., the chunks of data obtained from the index) provides context to the LLM (e.g., the trained LLMs from 206 and/or the LLM 12 in the copilot 102) in a custom prompt that allows the LLM to generate context specific answers to the queries 10.

By using the LLM pipeline 200 to retrieve information from a custom dataset specific to an industry of the user 106 for responding to the queries 10, the LLMs may provide responses that are grounded to the queries 10 in a specific context of the industry of the user 106.

Figure 3:
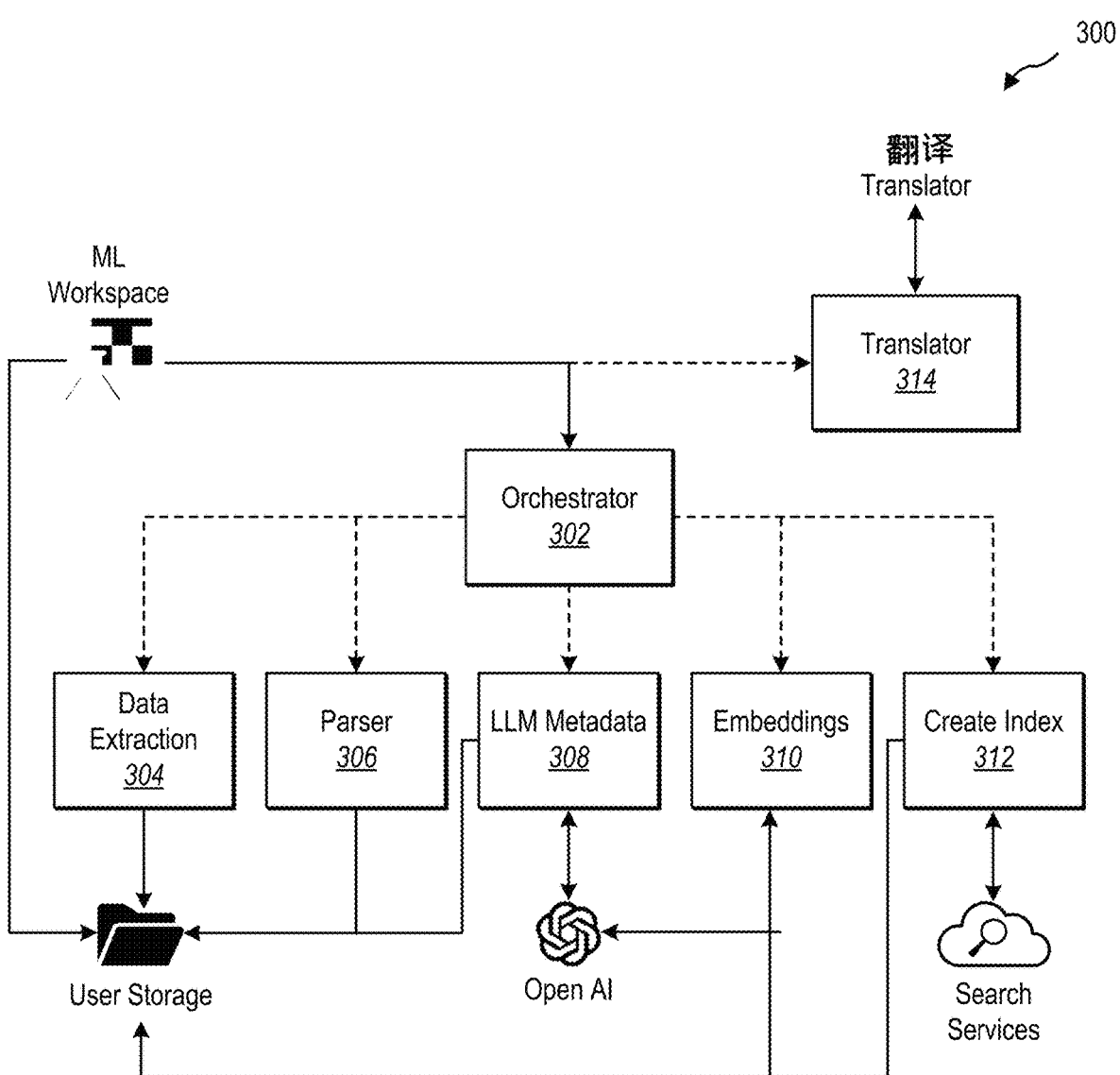
FIG. 3 illustrates an example architecture of a large language model pipeline in accordance with implementations of the present disclosure.

FIG. 3 illustrates an example architecture 300 for use with the LLM pipeline 200 (FIG. 2). In some implementations, the architecture 300 is used to implement the LLM pipeline 200 and streamline the process of data acquisition and analysis. The architecture 300 includes an orchestrator 302 that defines when each component of the architecture 300 is executed in the LLM pipeline 200. In some implementations, a default order is implemented. For example, the default order is a data extraction component 304, a parser component 306, an LLM metadata component 308, a translation component 314, an embeddings component 310, and index creation component 312. In some implementations, the order is implemented in response to information provided by the user 106.

The data extraction component 304 extracts data from various document formats. In some implementations, the data extraction component 304 is a machine learning library for extracting, parsing, and analyzing bibliographic information from raw documents such as academic papers, journals, and technical reports. In some implementations, the data extraction component 304 is Grobid (GeneRation Of Bibliographic Data), an open-source machine learning library for extracting, parsing, and analyzing bibliographic information from raw documents. Developed primarily for processing PDF files, Grobid leverages a combination of techniques such as CRF (Conditional Random Fields), LSTM (Long Short-Term Memory) neural networks, and other probabilistic models to recognize and structure various components of scholarly documents, including metadata (e.g., titles, authors, affiliations), citation details, and references. By transforming unstructured data into structured XML or TEI (Text Encoding Initiative) formats, Grobid facilitates information retrieval, digital library management, and academic research.

The parser component 306 processes and converts articles from XML or TEI formats into structured data formats, such as, JSON, JSONL, and Markdown, which are understandable and usable by AI models. In some implementations, the parser component 306 is a Grobid parser that parses the XML, extracts metadata, handles content chunking, and transforms tables into CSV format. The Grobid parser also provides a command-line interface for batch processing, leveraging multiprocessing for efficiency, and supports custom chunking strategies and metadata inclusion, facilitating the use of the extracted data for further analysis. In some implementations, two different chunking strategies are implemented: one strategy that uses a text splitter recommended for generic text and is parameterized by a list of characters and chunks the text based on a specific number of tokens. The other strategy chunks the document by the sections provided by Grobid.

The LLM metadata component 308 extracts and organizes metadata from PDF documents. In some implementations, the LLM metadata component 308 leverages OpenAI GPT-4 to extract and organize metadata from PDF documents, and machine learning tables (MLTables) for handling structured data. The LLM metadata component 308 processes an input MLTable of PDF files, extracts content, queries the OpenAI model for metadata on specified topics, and aggregates the results into a structured output. Configuration is managed through command-line arguments, and the script culminates in saving processed data as a JSON Lines file in an MLTable format in the designated output directory.

The translator component 314 interacts with a translation service API to translate text segments from various languages to English. The translator component 314 has methods to detect the language of the input text and to translate a given text segment. In some implementations, the method used by the translator component 314 loads data from an input MLTable, iterates over partitions, detects languages, translates text contents, and logs the status codes of translation requests.

The embeddings component 310 generates embeddings of text documents that capture the semantic meaning of texts. In some implementations, the embeddings component 310 creates embeddings of text documents using the HUGGINGFACEEMBEDDINGS class from the LANGCHAIN library. The embeddings component 310 takes an input MLTable containing text data, applies a pre-trained model to create embeddings for each text entry, and saves the resulting embeddings to a specified output MLTable. The script uses ARGPARSE for command-line interface, allowing users to specify the input MLTable, the embedding model (with a default provided), the device for computation (CPU or GPU), and the output MLTable path. The embeddings component 310 may also leverage external services such as OpenAI embedding models.

The index creation component 312 provides filtering mechanisms throughout the retrieval process that quickly and accurately retrieve the most relevant embeddings for a given query. In some implementations, the index creation component 312 leverages search services to provide the filtering mechanisms throughout the retrieval process. One example search service is AZURE AI SEARCH. The index creation component 312 enables the users 106 to tailor search queries more precisely by including or excluding content from the index based on predefined criteria, either before the search is conducted or as the results are processed. For example, the users 106 can refine searches to focus on documents from certain locations (e.g., the state of Washington or Brazil), or the users 106 can narrow down the search to categories, such as, crop diseases, cattle, or specific types of farming equipment. Another dimension of filtering is by the data source. For example, the users 106 may choose to retrieve content solely from a specific company's tractor manuals. To further enhance the specificity of the search results, the filters may be combined, allowing for complex queries, such as, identifying all documents related to cattle from Washington state that were published after the year 2020. The filtering capabilities are made possible by defining "filterable" fields or columns within the search index. Such fields are populated with metadata extracted from the documents during the indexing pipeline, ensuring that users 106 can find the most relevant information efficiently using search service.

In some implementations, the LLM pipeline 200 includes two paths finetuning (e.g., 206 in FIG. 2) and RAG (e.g., 212 in FIG. 2). Metadata flows between the components (the orchestrator 302, the data extraction component 304, the parser component 306, the LLM metadata component 308, the translation component 314, the embeddings component 310, and the index creation component 312) in the architecture 300 ensuring a coherent and integrated LLM pipeline 200. The metadata helps handle the complex data ingestion, extraction, and question and answer generating processes of the LLM pipeline 200.

In some implementations, the metadata includes pipeline-related metadata with information relating to the component. For example, the pipeline-related metadata includes component name and version that identify the specific components and versions used within the LLM pipeline 200. The component name and version are used for version control, debugging, and system updates. The pipeline-related metadata also includes input arguments that provide specific instructions or parameters that guide the functioning of the components in the LLM pipeline 200, enabling tailored operations based on the data or task.

In some implementations, the metadata includes file-related metadata. The file-related metadata is extracted from the parser component 306 (e.g., a PDF parser). For example, the file-related metadata includes a title of the document, a date of creation, author information, a directory indicating a location where the document is stored, images (visual data or diagrams) included in the document, and user-defined metadata with information known or defined by a user that might ground the LLM. The file-related metadata may be used to filter searches. For example, the user-defined metadata includes assigning a geographic polygon or set of coordinates to a document to filter searches. The file-related metadata may also be used to track when a particular portion of the document has been processed or changed by the LLM pipeline 200.

In some implementations, the metadata includes LLM-generated metadata. One example of LLM-generated metadata is GPT (Generative Pretrained Transformer)-generated metadata. For example, the LLM-generated metadata includes topic and categories with classifications of the content within the document. Examples include specific areas of interest, such as, crop diseases, cattle, or farming equipment. The LLM-generated metadata helps categorize and sort the data for easier retrieval and analysis by the LLM pipeline 220. In some implementations, the areas of interests are defined by the user 106.

FIG. 4 illustrates example questions generated during the question and answer generation portion 208 (FIG. 2) of the LLM pipeline 200 (FIG. 2). The question and answer generation portion of the LLM pipeline 200 combines the supporting context and section content of the data extracted from the custom dataset, prompting an LLM to generate a set of questions based on the context and section content. The prompt includes a system preamble that guides the LLM into formulating assessment questions related to industrial topics based on the document content (e.g., the list of locations and agronomic topics mentioned in the document). For example, the LLM generates the questions 402, 404, 406, 408, 410, 412, 414, 416 in response to the prompt from the data extracted from the custom dataset.

FIG. 5 illustrates an example evaluation (e.g., the evaluation portion 210) of questions generated during the question and answer generation portion 208 (FIG. 2) of the LLM pipeline 200 (FIG. 2). The illustrated evaluation uses the relevance metric to evaluate the informativeness of a generated question and answer pair from a perspective of the user 106 ensuring that the generated content is relevant and accurate to the target audience, considering all provided information. For example, a LLM (e.g., GPT-4) is used to rate the question on a scale of 1 to 5, with 5 being a question that would be asked by the user and 1 a question that would not, given the context. The relevance score 502 is provided with an explanation 504 of the relevance score 502.

FIG. 6 illustrates an example evaluation (e.g., the evaluation portion 210) of answers generated during the question and answer generation portion 208 (FIG. 2) of the LLM pipeline 200 (FIG. 2). The illustrated evaluation uses the succinctness metric evaluating a succinctness of the answers. For example, a scoring sheet describing what succinct and verbose answers might contain is provided as a prompt to a LLM (e.g., GPT-4), the ground truth answer, and the LLM answer, and asked for a grade on a scale from 1 to 5. The LLM provides the scores 602, 606 along with an explanation 604, 608 for the scores 602, 606.

FIG. 7 illustrates an example (e.g., the evaluation portion 210) of answers generated during the question and answer generation portion 208 (FIG. 2) of the LLM pipeline 200 (FIG. 2). The illustrated evaluation uses a correctness metric that evaluates a correctness of the answers. For example, a scoring sheet describing what a complete, partially correct, or incorrect answer contains is provided as a prompt to a LLM (e.g., GPT-4), the ground truth answer, and the LLM answer, and asked for a grade of correct, incorrect, partially correct. In the illustrated example, the LLM provides a score 702 of partially correct with an explanation 704 with reasons supporting why the answer is partially correct.

FIG. 8 illustrates an example output 800 provided by the copilot 102 (FIG. 1) in response to a query 10 provided by the user 106 (FIG. 1). The query 10 references a field (Lowery Field) of the user 106. The LLM 12 (FIG. 1) evaluates the descriptions 14 (FIG. 1) provided by the tool parser 26 (FIG. 1) of the available tools 16 for use with the copilot 102 and determines a match occurs between a description of a tool 16 with a curated dataset for the Lowery Field. The LLM 12 calls a plugin 104 (FIG. 1) with the tool 16 having the information for the Lowery Field in response to the query 10. The LLM 12 uses the information provided by the plugin 104 in response to the tool 16 performing a function (e.g., retrieving information for Lowery Field) and uses the information provided by the plugin 104 to generate a response 802 to the query 10 using the data available for Lowery Field. By using a curated dataset available for use with the plugin 104, the LLM 12 provides the user 106 with a response 802 grounded with relevant factors for Lowery Field.

FIG. 9, illustrates an example method 900 for responding to queries using a copilot 102 (FIG. 1). The actions of the method 900 are discussed below in reference to FIGS. 1-8.

At 902, the method 900 includes receiving, at an LLM, a query and a description of a plurality of tools available for use with the LLM. For example, a user 106 accesses the copilot 102 using a device and the provides a query 10 to the copilot 102. The copilot 102 uses one or more LLMs 12 to understand the queries 10, summarize, predict, and generate content in response to the queries 10.

In some implementations, the copilot 102 uses one or more plugins 104 to enhance the capabilities of the LLM 12 and provide responses to the queries 10 for a specific context of the user 106. Each plugin 104 performs a function or set of functions. Each plugin 104 has a plurality of tools 16 that perform the functions of the plugin 104. Each tool 16 of the plurality of tools performs a function that provides the LLM 12 additional capabilities in providing a response to the query 10. The plugins 104 are dynamically added for use with the copilot 102. In some implementations, a set of the plugins 104 are automatically selected for use with the copilot 102 for a specific industry or domain of the user 106. In some implementations, the plugins 104 are selected by the user 106 for use with the copilot 102. By allowing the dynamic selection or creation of the plugins 104, the user 106 may create a custom copilot 102 to help the LLM 12 provide responses to the queries 10 of the user 106 in a specific context of the user 106.

Descriptions are provided to the LLM 12 that describe the functions provided by the plurality of tools. In some implementations, the tool parser 26 sends a request 18 to a rest API 20 of the plugin 104 and receives from the rest API 20 a set of tools 16 available for the one or more plugins 104 available for use with the copilot 102 and a description of the functions performed by the set of tools 16. The tool parser 26 provides the description 14 of the functions available for the set of tools 16 to the LLM 12. In some implementations, the plurality of tools are included in a plugin 104 remote from the copilot 102 hosting the LLM 12 and the copilot 102 accesses the plugin 104 via a network. In some implementations, the plurality of tools are included in a plurality of plugins 104 remote from the copilot 102 hosting the LLM 12 and the copilot 102 accesses the plurality of plugins 104 via a network. In some implementations, the plugins 104 use a standard format and are created by the users 106 for use with the copilot 102.

In some implementations, the tool 16 is a specialized model trained using a LLM pipeline 200 to answer specific questions by retrieving information from a custom dataset by searching an index of embeddings of the custom dataset and provides the information to the LLM 12 to use in responding to the query 10. The LLM pipeline 200 includes creating a dataset to train the specialized model by generating questions and answers from a custom dataset; using the questions and answers to train the specialized model; and using metrics to evaluate a quality of the questions and answers and a quality of the specialized model.

At 904, the method 900 includes determining, by the LLM, to use a tool in response to the description of the tool matching a portion of the query. The LLM 12 determines to use a tool 16 in response to the description 14 of the tool 16 matching a portion of the query 10.

At 906, the method 900 includes providing a call to the tool with the query. The LLM 12 provides a call 30 to the tool 16 with the query 10. In some implementations, the call 30 includes a subquery generated by the LLM 12 to aid the LLM 12 in responding to the query 10.

At 908, the method 900 includes receiving information from the tool in response to the call. In some implementations, the LLM 12 sends the query 10 in a call 30 to the tool 16 as input to the tool 16. The tool 16 uses the query 10 as input, performs a function on the query 10, and provides a response 22 with the result of the function performed by the tool 16 to the rest API 20. The rest API 20 forwards the response 22 to the copilot 102 for the LLM 12 to use in responding to the query 10. In some implementations, the LLM 12 generates a sub query from the query 10 and sends a sub query in a call 30 as input to the tool 16. The tool 16 performs a function on the sub query and provides a response 22 with the result of the function performed by the tool 16 to the rest API 20.

At 910, the method 900 includes using, by the LLM, the information in providing a response to the query. The rest API 20 forwards the response 22 to the copilot 102 for the LLM 12 to use in responding to the query 10. The LLM 12 uses the information from each tool 16 to provide a response to the query 10. In some implementations, the LLM 12 uses a custom dataset for a context of a user 106 that provided the query 10 in generating a tailored response to the context of the user 106.

In some implementations, the LLM 12 determines to use a set of tools in response to the description of the set of tools matching a portion of the query 10 and the LLM 12 provides a call 30 to each tool 16 of the set of tools with the query 10. The LLM 12 receives the information from each tool 16 in response to each call 30 and uses the information from each tool 16 to provide a response to the query 10. In some implementations, the LLM 12 provides the calls to each tool in parallel. In some implementations, the LLM 12 provides the calls to each tool in a chain.

At 912, the method 900 includes outputting the response to the query. The copilot 102 outputs the response to the query 10. For example, the copilot 102 presents the response on a user interface of a device of the user 106.

The method 900 use the tools 16 to extend the capability of the LLM 12 in the copilot 102 to provide fast responses to the queries 10 provided by the user 106. The LLM 12 in the copilot 102 also uses the tools 16 to provide tailored responses to a context of the user 106 in responding to the queries 10 provided by the user 106.

Figure 10:
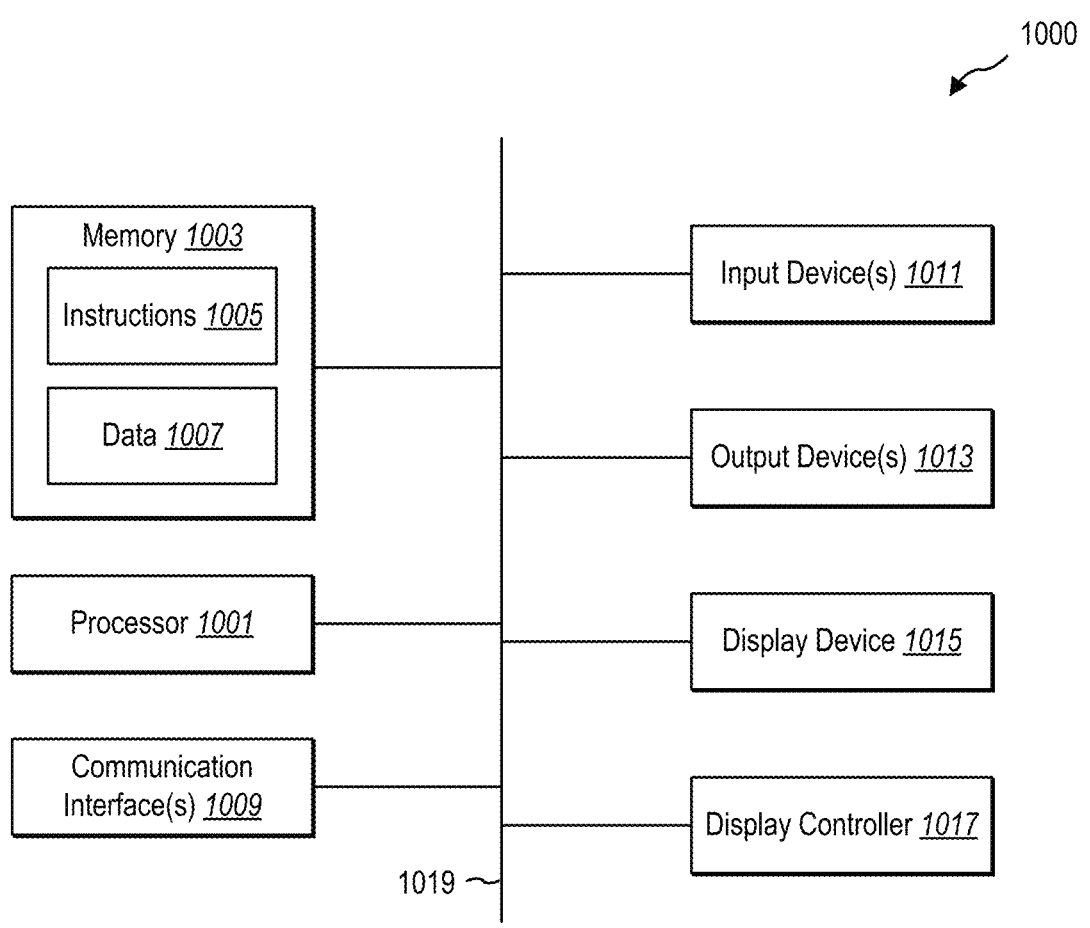
FIG. 10 illustrates components that may be included within a computer system.

FIG. 10 illustrates components that may be included within a computer system 1000. One or more computer systems 1000 may be used to implement the various methods, devices, components, and/or systems described herein.

The computer system 1000 includes a processor 1001. The processor 1001 may be a general-purpose single or multi-chip microprocessor (e.g., an Advanced RISC (Reduced Instruction Set Computer) Machine (ARM)), a special purpose microprocessor (e.g., a digital signal processor (DSP)), a graphics processing unit (GPU), a microcontroller, a programmable gate array, etc. The processor 1001 may be referred to as a central processing unit (CPU). Although just a single processor 1001 is shown in the computer system

1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

In some implementations, the various components of the computer system 1000 are implemented as one device. For example, the various components of the computer system 1000 are implemented in a mobile phone or tablet. Another example includes the various components of the computer system 1000 implemented in a personal computer. Another example includes the various components of the computer system 1000 implemented in the cloud. Another example includes the various components of the computer system 1000 implemented on an edge device.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model, a probabilistic graphical model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A method comprising:

receiving, at a large language model (LLM), a query and a description of a plurality of tools available for use with the LLM;

determining, by the large language model, to use a tool of the plurality of tools in response to a description of the tool of the plurality of tools matching a portion of the query;

providing a call to the tool with the query;

receiving information from the tool in response to the call;

using, by the LLM, the information in providing a response to the query; and outputting the response to the query.

2. The method of claim 1, wherein each tool of the plurality of tools performs a function that provides the LLM additional capabilities in providing a response to the query and the description of the plurality of tools describes functions provided by the plurality of tools.

3. The method of claim 1, wherein the call includes a subquery generated by the LLM to aid the LLM in responding to the query.

4. The method of claim 1, further comprising:

determining to use a set of tools of the plurality of tools in response to a description of the set of tools matching a portion of the query;

providing a call to each tool of the set of tools with the query;

receiving information from each tool of the set of tools in response to the call to each tool of the set of tools; and using, by the LLM, the information from each tool to provide a response to the query.

5. The method of claim 1, wherein the plurality of tools are included in a plugin that is remote from a copilot hosting the LLM and the copilot accesses the plugin via a network.

6. The method of claim 1, wherein the plurality of tools are included in a plurality of plugins remote from a copilot hosting the LLM and the copilot accesses the plurality of plugins via a network.

7. The method of claim 6, wherein the plurality of plugins use a standard format and are created by a user for use with the copilot.

8. The method of claim 1, wherein the LLM uses a custom dataset for a context of a user that provided the query in generating a tailored response to the context of the user.

9. The method of claim 1, wherein the tool of the plurality of tools is a specialized model trained using a LLM pipeline to answer specific questions by retrieving the information from a custom dataset by searching an index of embeddings of the custom dataset and provides the information to the LLM to use in responding to the query.

10. The method of claim 9, wherein the LLM pipeline includes:

creating a dataset to train the specialized model by generating questions and answers from a custom dataset;

using the questions and answers to train the specialized model; and using metrics to evaluate a quality of the questions and answers and a quality of the specialized model.

11. A device comprising:

a memory to store data and instructions; and a processor operable to communicate with the memory, wherein the processor is operable to:

receive, at a large language model (LLM), a query and a description of a plurality of tools available for use with the LLM;

determine, by the large language model, to use a tool of the plurality of tools in response to a description of the tool matching a portion of the query;

provide a call to the tool with the query;

receive information from the tool in response to the call;

use, by the LLM, the information in providing a response to the query; and output the response to the query.

12. The device of claim 11, wherein each tool of the plurality of tools performs a function that provides the LLM additional capabilities in providing a response to the query and the description of the plurality of tools describes functions provided by the plurality of tools.

13. The device of claim 11, wherein the call includes a subquery generated by the LLM to aid the LLM in responding to the query.

14. The device of claim 11, wherein the processor is further operable to:

determine to use a set of tools of the plurality of tools in response to a description of the set of tools matching a portion of the query;

provide a call to each tool of the set of tools with the query;

receive information from each tool of the set of tools in response to the call to each tool of the set of tools; and use, by the LLM, the information from each tool to provide a response to the query.

15. The device of claim 11, wherein the plurality of tools are included in a plugin that is remote from a copilot hosting the LLM and the copilot accesses the plugin via a network.

16. The device of claim 11, wherein the plurality of tools are included in a plurality of plugins remote from a copilot hosting the LLM and the copilot accesses the plurality of plugins via a network.

17. The device of claim 16, wherein the plurality of plugins use a standard format and are created by a user for use with the copilot.

18. The device of claim 11, wherein the LLM uses a custom dataset for a context of a user that provided the query in generating a tailored response to the context of the user.

19. The device of claim 11, wherein the tool of the plurality of tools is a specialized model trained using a LLM pipeline to answer specific questions by retrieving the information from a custom dataset by searching an index of embeddings of the custom dataset and provides the information to the LLM to use in responding to the query.

20. The device of claim 19, wherein the LLM pipeline includes:

creating a dataset to train the specialized model by generating questions and answers from a custom dataset;

using the questions and answers to train the specialized model; and using metrics to evaluate a quality of the questions and answers and a quality of the specialized model.

* * * * *